(12) United States Patent
Herper et al.

(10) Patent No.: US 8,434,600 B2
(45) Date of Patent: May 7, 2013

(54) DAMPING DEVICE WITH ADJUSTABLE VARIABLE DAMPING CHARACTERISTICS, IN PARTICULAR FOR THE DAMPING OF MOVABLE FURNITURE PARTS

(75) Inventors: Markus Herper, Mühltal (DE);
Gabriele Schneider, Fränkisch-Crumbach (DE)

(73) Assignee: Grass GmbH & Co. KG, Reinheim (DE)

( * ) Notice: Subject to any disclaimer, the term of this patent is extended or adjusted under 35 U.S.C. 154(b) by 602 days.

(21) Appl. No.: 12/444,671

(22) PCT Filed: Sep. 28, 2007

(86) PCT No.: PCT/EP2007/008461
§ 371 (c)(1),
(2), (4) Date: Apr. 7, 2009

(87) PCT Pub. No.: WO2008/043441
PCT Pub. Date: Apr. 17, 2008

(65) Prior Publication Data
US 2010/0025173 A1    Feb. 4, 2010

(30) Foreign Application Priority Data

Oct. 12, 2006  (DE) .................... 20 2006 015 656 U
Feb. 3, 2007   (DE) .................... 20 2007 001 571 U

(51) Int. Cl.
*F16F 9/48* (2006.01)
(52) U.S. Cl.
USPC ........................................ 188/285; 188/312
(58) Field of Classification Search .............. 199/282.8, 199/285, 289, 299.1, 312, 316, 317, 319.2, 199/322.15; 312/319.1, 319.2, 319.8; 188/282.8, 188/188/285, 289, 299.1, 312, 316, 317, 188/319.2, 322.15
See application file for complete search history.

(56) References Cited

U.S. PATENT DOCUMENTS 1,492,328 A * 4/1924 Lang ............................. 188/275
1,554,249 A * 9/1925 Wolf ........................... 188/282.1
(Continued)

FOREIGN PATENT DOCUMENTS

| DE | 51626 A | 4/1890 |
| DE | 1094534 B | * 7/1958 |

(Continued)

OTHER PUBLICATIONS

English Language Abstract for DE 19857297.

(Continued)

*Primary Examiner* — Robert A Siconolfi
*Assistant Examiner* — Stephen Bowes
(74) *Attorney, Agent, or Firm* — Norris McLaughlin & Marcus, P.A.

(57) ABSTRACT

Damping device for damping motion of movable furniture parts. A piston mounted in housing in longitudinally displaceable manner which, due lo displacement, forms two variable-size working chambers on opposite sides with damping medium. Via overflow-connection, throttled transfer of damping medium is possible between two working chambers. Piston plunger, fed selectively, is connected on one side of pislon. Via the outer end of piston plunger, the motion of the furniture part to be damped is transferred to the piston. On side of piston, an elongated adjustment shaft is connected to the piston plunger. Free end of plunger is fed in sealed manner out of front face lying opposite front face that is sealed on the piston plunger side. The end of adjustment shaft engages with a passage duct connecting two working chambers and forms a variable-sized throttle cross section in the passage duct, making adjusting motion of shaft relative to piston.

23 Claims, 6 Drawing Sheets

U.S. PATENT DOCUMENTS

| | | | |
|---|---|---|---|
| 1,586,901 A | | 6/1926 | Hubbell |
| 1,658,962 A | * | 2/1928 | Aikens .......................... 188/287 |
| 1,770,250 A | | 7/1930 | Norton |
| 4,867,286 A | * | 9/1989 | Taylor ......................... 188/282.5 |
| 4,981,199 A | * | 1/1991 | Tsai ............................. 188/312 |
| 5,558,190 A | | 9/1996 | Chang |

FOREIGN PATENT DOCUMENTS

| | | |
|---|---|---|
| DE | 1094534 B | 12/1960 |
| DE | 10300732 A1 | 12/1960 |
| DE | 4237156 C1 | 3/1994 |
| DE | 19717937 A1 | 5/1998 |
| DE | 19857297 C1 | 7/2000 |
| DE | 10350810 A1 | 6/2005 |
| FR | 2109 898 A | 5/1972 |
| GB | 1316551 | 5/2007 |
| JP | 06129470 A * | 5/1994 |

OTHER PUBLICATIONS

English Language Abstract for DE 19717937.
English Language Abstract for DE 10350810.
English Language Abstract for DE 10300732.
English Language Abstract for DE 1094534.
English Language Abstract for DE 4237156.
International Search Report for Application PCT/EP2007/008461 mailed Feb. 5, 2008.
German Search Report for Application 20 2006 015 656.9 dated May 31, 2007.

* cited by examiner

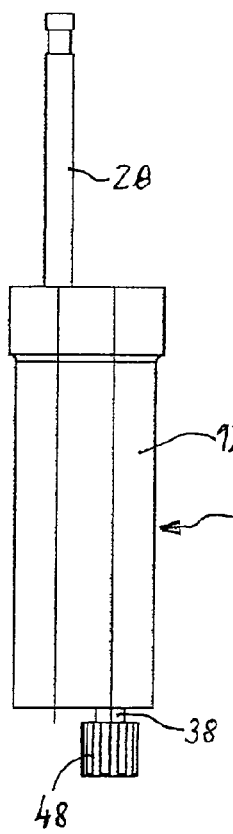
Fig. 10
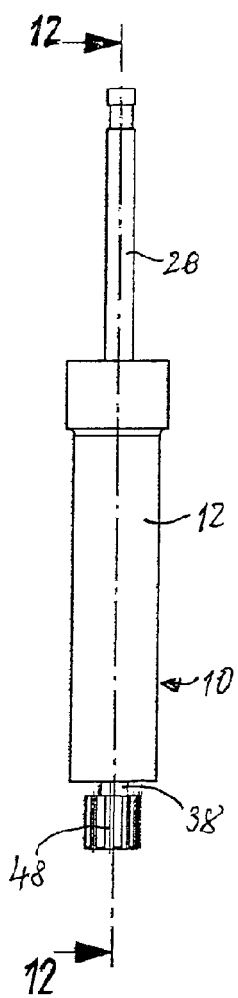
Fig. 11
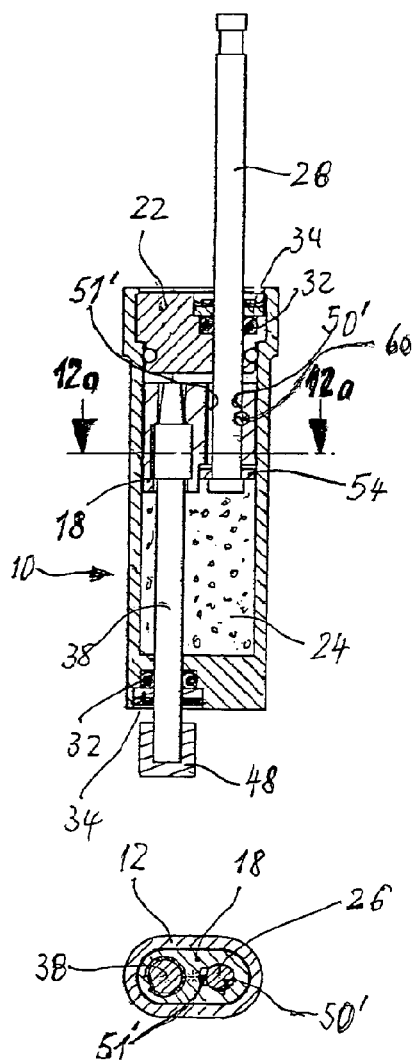
Fig. 12
Fig. 12a

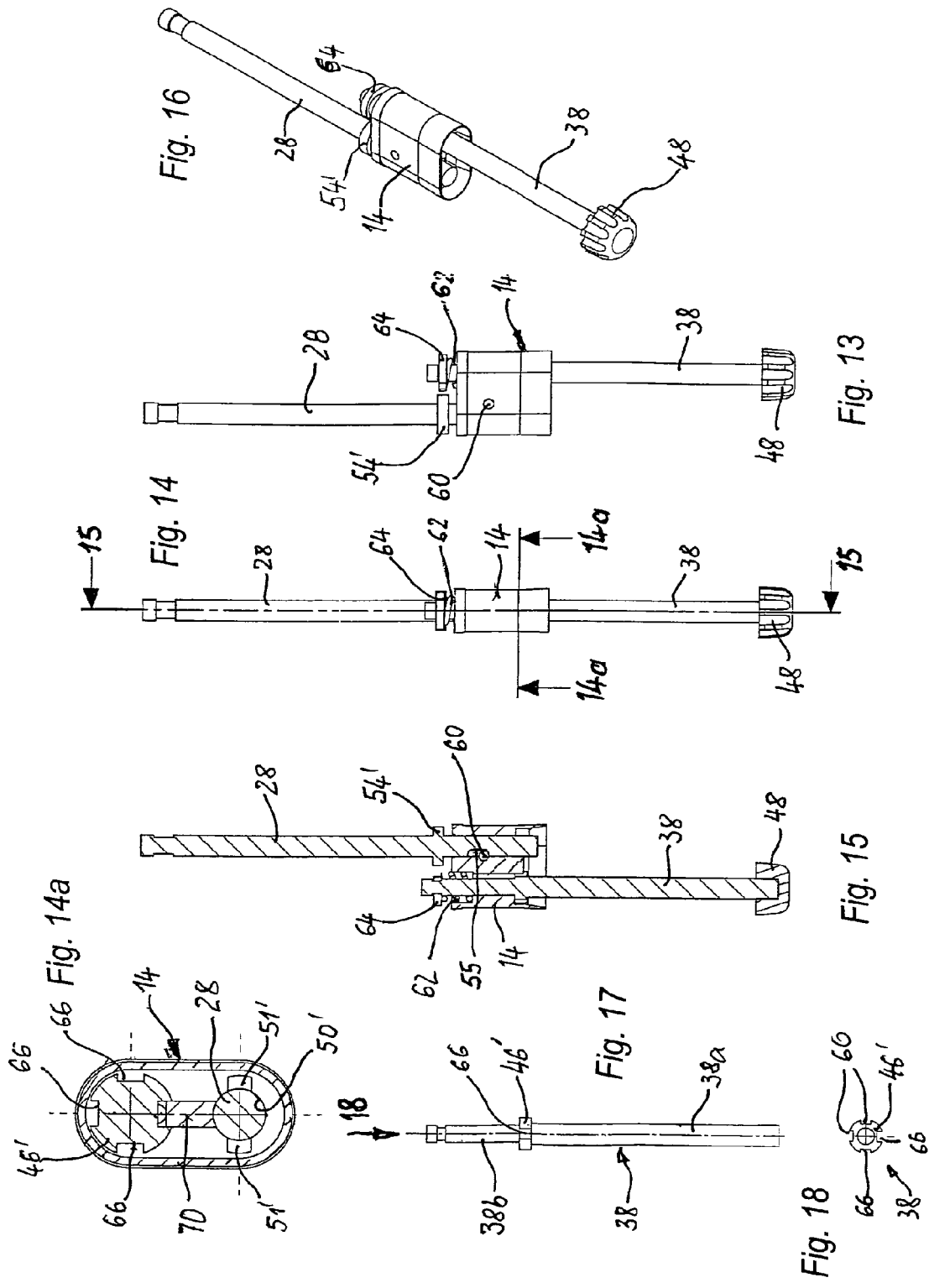

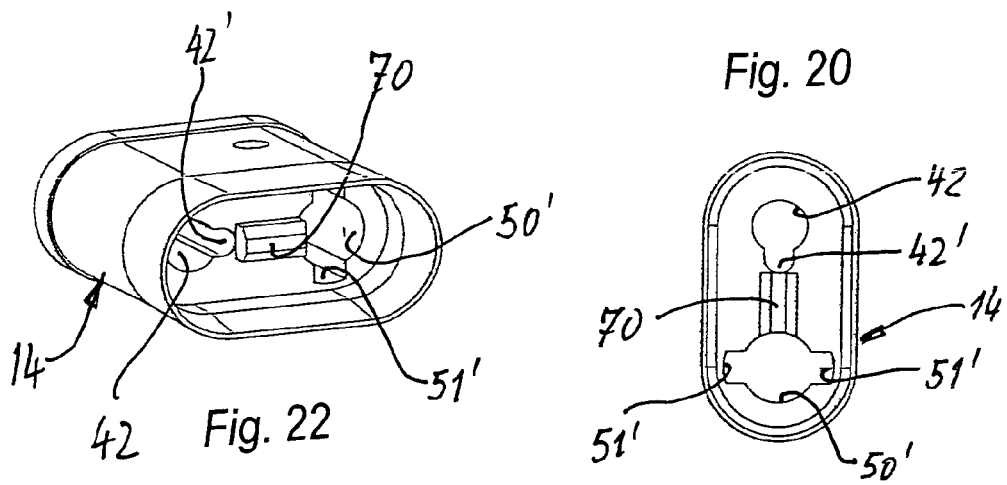
Fig. 20
Fig. 22
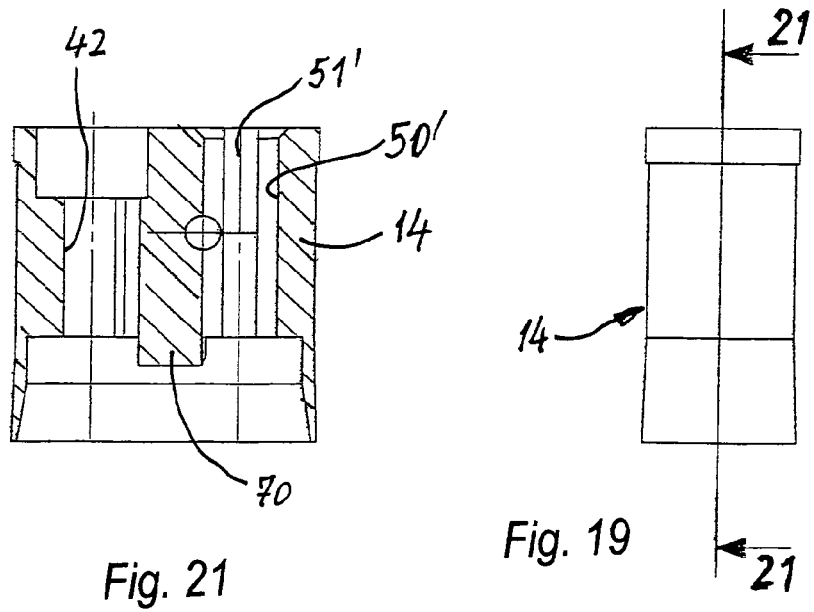
Fig. 21
Fig. 19

DAMPING DEVICE WITH ADJUSTABLE VARIABLE DAMPING CHARACTERISTICS, IN PARTICULAR FOR THE DAMPING OF MOVABLE FURNITURE PARTS

This application is a 371 application of PCT/EP2007/008461 filed Sep. 28, 2007, which claims priority to the German application 20 2006 015 656.9 filed Oct. 12, 2006 and German Application 20 2007 001 571.2 filed Feb. 3, 2007.

BACKGROUND OF THE INVENTION

1. Field of the Invention

The invention relates to a damping device, in particular for the damping of the movement of movable furniture parts of pieces of furniture, with a piston which is mounted in a housing so as to be longitudinally displaceable and which as a function of its displaced position forms on opposing sides two working chambers which are variable in size and are filled with a fluid damping medium, enabling by means of at least one overflow connection a throttle overflow o the damping medium between the two working chambers, wherein a piston rod which extends in a sealed manner out of the associated front end of the housing is connected on one side of the piston and the movement of the furniture part to be damped is transferred to the piston by way of the outer end of the piston rod remote from the piston.

2. Description of Related Art

In furniture construction such damping or also decelerating devices serve for example to avoid or certainly largely to reduce the stresses and noises occurring during the rapid vigorous closing of doors or closing of drawers of cabinets as the movable furniture part mounted on the carcass is decelerated jerkily. Damping devices which operate with viscous fluids, such as for example silicone oil, as damping medium (e.g. DE 103 00 73 A1) have the advantage over devices operating with gaseous damping medium that these fluid damping media are practically incompressible, so that they do not have any resilient properties which would seek to move the movable furniture part back somewhat out of the actual closed position after the closed position is reached. When such dampers are used the problem arises that the damping forces to be generated for damping of the movable furniture part are also dependent upon the mass of the respective furniture part and the speed of closing it, so that for different damping tasks different dampers are necessary which are adapted according to the required damping characteristic.

SUMMARY OF THE INVENTION

By contrast the object of the invention is to create a damping device for furniture parts which can be adjusted to different damping characteristics without conversion or replacement of individual parts. In this case the dimensions of the housing of the damping device should at least not be increased but should preferably be reduced by comparison with the damping devices known from the prior art.

Starting from a device of the type referred to in the introduction this object is achieved according to the invention in that on the side of the piston lying opposite the working chamber on the piston rod side there is connected an elongate adjusting shaft with a diameter substantially corresponding to the diameter of the piston rod, the free end of the adjusting shaft also extending out of the housing out of the end face lying opposite the end face closed on the piston rod side, and that the end of the adjusting shaft connected to the piston engages in a through channel connecting the two working chambers and is constructed in such a way that it forms a throttle cross-section which is variable in size in the through channel due to adjusting movements of the shaft relative to the piston. Due to the diameter of the adjusting shaft having the same dimensions as the diameter of the piston rod the total volume of the two working chambers remains the same during the displacement of the piston in the housing, so that there is no necessity for a volume equalisation device which increases the external dimensions of the damper housing and which receives or feeds back the difference in the fluid damping medium forced out of the working chambers or flowing into them as the piston is displaced. In this respect the damping device according to the invention corresponds functionally to damping devices with piston/cylinder dampers operating with a piston rod running through, i.e. extending out of the end faces of the housing and sealed at both ends. In addition, due to the arrangement of the adjusting shaft in the working chamber remote from the piston rod as an actuating shaft for a throttle means the desired alteration of the damping characteristic of the damping device from the exterior is made possible, i.e. without opening of the housing.

In a preferred alternative embodiment of the invention the construction is such that in the end region of the adjusting shaft on the piston side a threaded portion is provided which is enlarged in diameter by comparison with the shaft diameter and engages in a portion of the through channel provided with a complementary matching thread, wherein at least one groove-like recess which forms a passage from the working chamber into the through channel is then provided in the threaded portion of the adjusting shaft and forms a part of the throttle channel connecting the two working chambers. A lug which tapers conically in the direction of its free end then projects from the end face of the threaded portion of the adjusting shaft remote from the working chamber into a portion of the through channel which is reduced in diameter relative to the threaded portion. By alteration of the depth to which the threaded portion of the adjusting shaft is screwed into the complementary matching thread of the through channel, the throttle cross-section can then be enlarged or reduced smoothly, so that a smooth change in the damping characteristic of the damping device is possible In this case a handle is advantageously provided on the outer free end of the adjusting shaft, the handle being constructed for example as a rotary knob which has a greater diameter than the shaft diameter of the adjusting shaft and is advantageously provided on its circumferential surface with grooves or knurlings.

In a preferred embodiment of the invention the longitudinal central axis of the piston rod is aligned with the longitudinal central axis of the housing.

On the other hand, the adjusting shaft and the through channel aligned therewith in the piston are—unlike hydraulic damping devices with a piston rod running through which extends out of the end faces of the housing on both sides— offset laterally and are disposed parallel to the longitudinal central axis of the housing.

In this case it is recommended that the housing and the piston disposed so as to be longitudinally displaceable— unlike a circular cross-section—are constructed in such a way that they have a cross-section which is oval or is formed by two parallel straight boundaries which are closed at their ends by circular arcs. Due to this "compressed" cross-sectional shape of the housing of the damping device it is possible to dispose the damping device also in those regions of a piece of furniture in which there is only a small spacing between the furniture parts which are moved relative to one another. By way of example reference is made here to the spacing between the outer face of a drawer side wall and the associated inner face of the carcass of the drawer cabinet.

In an advantageous alternative embodiment of the invention the construction may be such that in a region of the piston which is offset with respect to the region of the through channel receiving the adjusting shaft in relation to the longitudinal central axis of the housing, preferably diametrically opposed, a second through channel is provided which connects the two working chambers and via which damping medium can flow between the working chambers.

Then a shaft is advantageously disposed in the second through channel so as to be longitudinally movable by a predetermined stroke, wherein at least in a part-region the cross-sectional surface of the shaft is smaller than the clear cross-sectional surface of the second through channel in order to form an overflow passage between the working chambers.

For presetting different damping characteristics with opposing stroke movements of the piston it may then be advantageous. On one of the free ends of the shaft retained in the second through channel a valve disc may be provided which has a larger cross-section at least in some areas than the cross-section of the second through channel and which, in the case of a higher pressure in the adjoining working chamber than at the free end of the opposing second working chamber, is pressed onto the facing end wall of the piston and closes the overflow passage at least partially and then prevents overflow of damping medium between the working chambers and acts functionally as a non-return valve.

A pin, of which the opposing free ends projecting from the shaft engage in slot-like slits in the piston which extend in the longitudinal direction of the shaft, passes through the end of the shaft lying opposite the end provided with the valve disc. Thus within the scope of the stroke predetermined by the valve disc on the one hand and one end of the slot-like slit on the other hand the shaft retained in the second passage is retained so as to be longitudinally movable but undetachable in the piston.

If the damping device according to the invention is to produce the higher damping effect when the piston rod is inserted into the housing, the design is such that the valve disc is provided on the free end of the shaft which is retained in the second through channel and is directed into the working chamber through which the adjusting shaft passes. The pressure in the damping medium which rises during insertion of the piston rod in the second working chamber then forcibly presses the valve disc onto the facing end face of the piston, whereby the overflow cross-section formed between the shaft and the through channel is closed partially or completely—depending upon the design of the valve disc.

In a further embodiment of the invention which is optimised in an advantageous manner with regard to its external dimensions the design may be such that, with the longitudinal central axis of the piston rod offset laterally with respect to the longitudinal central axis of the adjusting shaft, the piston rod is retained in a through opening in the piston in such a way that its free end within the housing still projects over the adjoining lateral region of the end face of the piston into the associated working chamber, that an overflow passage is formed in the region of the through opening in the piston through which the piston rod passes, and that on the end of the piston rod projecting into the appertaining working chamber a valve disc is retained so as to be movable between a position in which it rests on the piston end face and closes the overflow passage and a position in which it is lifted off from the piston end face and connects the overflow passage to the adjoining working chamber. Thus in this case the non-return function of the shaft which in the first embodiment is disposed in a second passage with a valve disc is realised directly in the region of the end of the piston rod within the housing, so that the space which is necessary for the second passage and inevitably enlarges the dimensions of the piston.

In this case the design is advantageously such that the through opening in the piston has a circular cross-section which substantially corresponds to the diameter of the piston rod and is provided in a part-region with a radial expansion of the diameter which produces a through groove forming an overflow passage in the through opening.

In a variant of the previously described embodiment of the damping device the adjusting shaft can be disposed in the through channel of the piston so as to be rotatable and longitudinally movable by a predetermined stroke and can be retained so as to be biased resiliently into an end position in which a throttle collar which projects radially from the circumferential surface of the adjusting shaft in the working chamber on the adjusting shaft side rests on the piston end face, wherein the throttle collar is then provided with a plurality of cut-outs which are offset with respect to one another in the circumferential direction with differing passage cross-sections and which can be selectively aligned, by rotation of the adjusting shaft in the through channel, with an overflow passage provided in the piston and connecting the working chambers. By rotation of the adjusting shaft in such a way that cut-outs with differing passage cross-sections come into alignment with the overflow passage the throttle effect and thus the damping characteristic of the damping device can then be altered in a number of stages which corresponds to the number of cut-outs.

In this case the overflow passage is preferably formed by a groove-like recess in the wall of the through channel which has a complementary diameter to the adjusting shaft and passes through the piston.

The cut-outs in the throttle collar are preferably formed by cut-outs of differing radial extent which open in the circumferential surface of the throttle collar.

The selected throttle stage can be fixed in that a projection which corresponds in width to the cut-outs in the throttle collar projects from the end face of the piston facing the throttle collar, engages in one of the cut-outs in the position in which it is forced resiliently into the contact position of the throttle collar on the piston end face, and locks the adjusting shaft against rotation, wherein this locking position can be produced by longitudinal displacement of the adjusting shaft against the resilient spring bias out of the engaged position of the projection with the cut-out and the adjusting shaft is then rotatable into a different throttle position.

The overflow of the damping medium from the working chamber through which the adjusting shaft passes into the working chamber through which the piston rod passes can also be made possible in that the piston rod is retained in the piston so that it is longitudinally movable in a through opening by a predetermined stroke, that at least one overflow passage is constructed in the region of the through opening through which the piston rod passes, and that the piston rod is provided in the working chamber through which it passes with a valve collar in the shape of an annular disc which is adjustable during the longitudinal displacement of the piston rod within the scope of the predetermined stroke between a position in which it rests on the associated piston end surface and thereby closes the overflow passage and a position in which it is lifted off from the piston end face and frees the overflow passage. Thus in this embodiment the valve collar—which is preferably formed integrally on the piston rod—replaces the valve disc which is disposed so as to be longitudinally movable on the free end of the piston rod in the working chamber on the adjusting shaft side.

DESCRIPTION OF THE SEVERAL VIEWS OF THE DRAWINGS

The invention is explained in greater detail in the following description of three embodiments in conjunction with the drawings, in which:

FIG. 10 shows a side view of the second embodiment of a damping device according to the invention;

FIG. 11 shows a view in the direction of the arrow 11 in FIG. 10;

FIG. 12 shows a side view in the direction of the arrows 12-12 in FIG. 11;

FIG. 12a shows a sectional view in the direction of the arrows 12a-12a in FIG. 12;

FIG. 13 shows a side view of an assembly comprising the piston, the piston rod and the adjusting shaft of a third embodiment of a damping device according to the invention;

FIG. 14 shows a view in the direction of the arrow 14 in FIG. 13;

FIG. 14a shows a sectional view in the direction of the arrows 14a-14a in FIG. 14 on an enlarged scale;

FIG. 15 shows a sectional view in the direction of the arrows 15-15 in FIG. 14;

FIG. 16 shows an isometric representation of the assembly of the third embodiment shown in FIGS. 13 to 15;

FIG. 17 shows a side view of the adjusting shaft of the assembly shown in FIGS. 13 to 16;

FIG. 18 shows a view of the adjusting shaft viewed in the direction of the arrow 18 in FIG. 17;

FIG. 19 shows a corresponding view of the piston of the assembly in the viewing direction of FIG. 14;

FIG. 20 shows a view of the underside of the piston viewed in the direction of the arrow 20 in FIG. 19;

FIG. 21 shows a sectional view in the direction of the arrows 21-21 in FIG. 19; and FIG. 22 shows an isometric view of the piston shown in FIGS. 19 to 21 viewed in an oblique direction with respect to its underside.

DETAILED DESCRIPTION OF THE PREFERRED EMBODIMENTS

Figure 1:
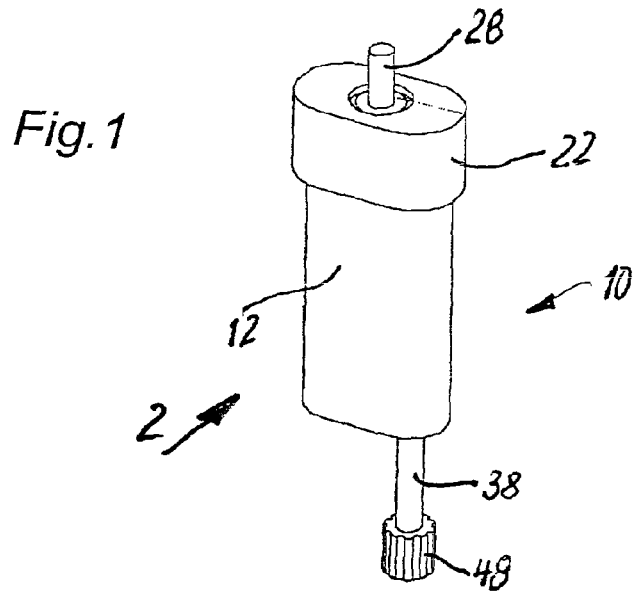
FIG. 1 shows an isometric view of a first embodiment of a damping device according to the invention in which the piston rod is completely inserted into the housing.
Figures 2, 3, 4:
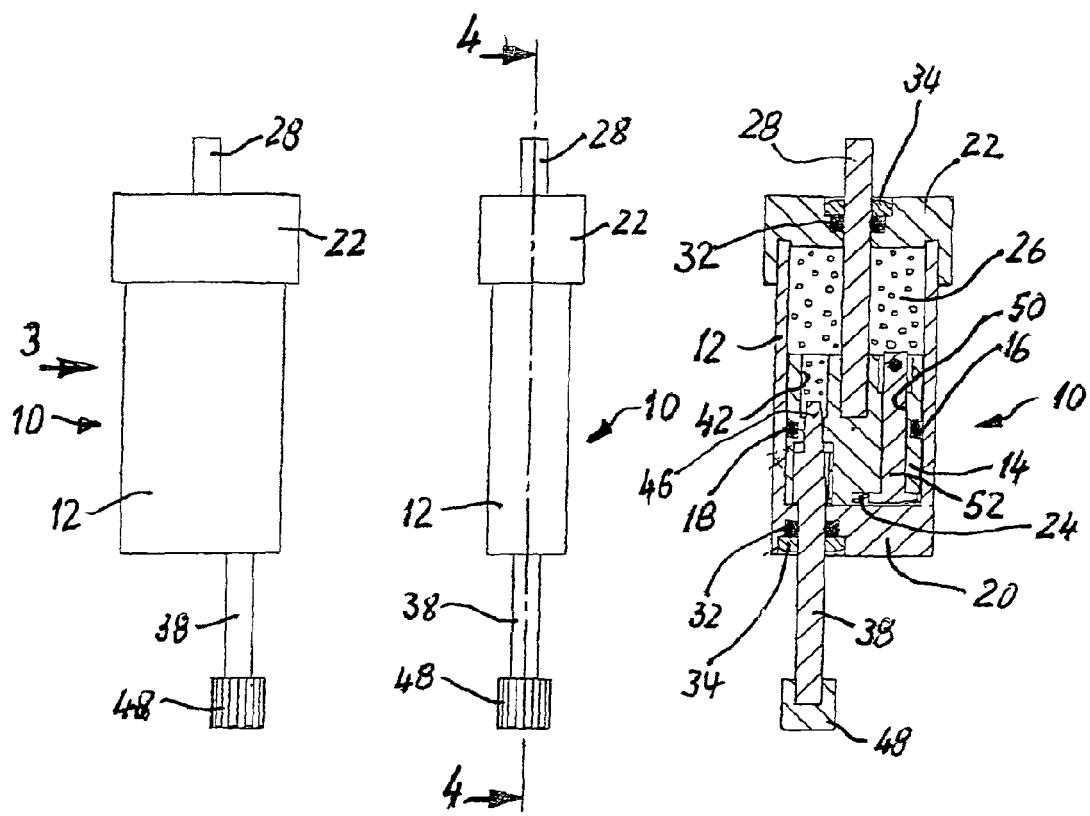
FIG. 2 shows a side view of the damping device viewed in the direction of the arrow 2 in FIG. 1.
FIG. 3 shows a view of the damping device viewed in the direction of the arrow 3 in FIG. 2.
FIG. 4 shows a sectional view in the direction of the arrows 4-4 in FIG. 3.
Figure 5:
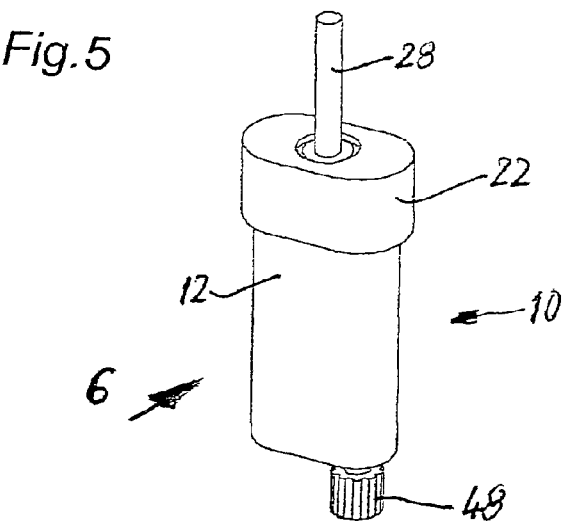
FIG. 5 shows an isometric representation of the damping device, corresponding to the illustration in FIG. 1, in the position in which the piston rod is completely withdrawn from the housing.

The first embodiment of the damping device according to the invention which is illustrated in FIGS. 1 to 8a and is designated as a whole by 10 has a housing 12 which in the specially illustrated case—unlike known damping devices with a hollow cylindrical housing which is therefore also denoted briefly as a rule as a "cylinder"—has a cross-section formed by two parallel straight boundary edges connected at their ends by semi-circular boundary lines. Accordingly in the hollow interior of this housing 12 a piston 14 with a cross-section complementary to the interior of the housing is inserted so as to be movable, and with a sealing ring 18 inserted into a circumferential groove 16 in the outer piston wall this piston seals the circumferential slit-shaped intermediate space between the outer face of the piston and the inner face of the housing.

On its lower end in the drawings the housing 12 is closed by an integral end wall 20 and on its upper end it is closed by a separate housing cover 22 fixed on the housing 12, whereby in the interior of the housing working chambers 24, 26 which are filled with a fluid damping medium are produced respectively on opposing sides of the end faces of the piston 14.

A sealed piston rod 28 passing through the housing cover 22 and rigidly connected to the piston 14 at its end within the housing transfers to the piston 14 movements introduced by the movable furniture part to be damped into its free outer end, so that the piston is displaced thereby in the housing 12, whereby the volumes of the working chambers 24, 26 are each increased or decreased as a function of the direction of movement of the piston 14. According to the change in the volumes of the working chambers the damping medium enclosed in the housing must be capable of passing from the decreasing working chamber into the opposing increasing working chamber. For this purpose through channels are formed in the piston 14, the design of these through channels being explained in greater detail below.

The sealing of the piston rod 28 in the housing cover is performed by a sealing ring 32, which is inserted into a stepped through opening 30 in the housing cover 22 and in the illustrated case is constructed as an O-ring, which is retained by an annular disc 34. A toothed disc 36 which digs into the wall of the opening 30 with its resilient outwardly biased teeth fixes the disc 34 and thus the sealing ring 32 in the housing cover 22.

The working chamber 24 lying opposite the working chamber 26 through which the piston rod 28 passes has passing through it an adjusting shaft 38 which is laterally offset with respect to the piston rod 28 projecting centrally from the piston 14, the adjusting shaft for its part being passed in a similar manner to the piston rod 28 through a stepped opening 30 in the housing end wall 20. Also in this case the sealing is again performed by a sealing ring 32 constructed as an O-ring which is retained by an annular disc 34 and an adjoining toothed disc 36 in the opening 30 and is sealed on the circumferential surface of the adjusting shaft 38. On the end on the piston side the adjusting shaft 38 is provided with a threaded portion 40 which is somewhat enlarged relative to the shaft diameter and which engages in a portion of the through channel 42 which is provided with a complementary matching thread and passes through the piston 14 so as to be laterally offset with respect to the piston rod 28. An elongate groove-like recess 44 which forms a passage from the working chamber 24 to the through channel 42 is provided in the threaded portion 40 of the adjusting shaft 38. A lug 46 which tapers conically in the direction of its free end projects from the end of the threaded portion 38 on the carcass side into a portion of the through channel 42 which is reduced in diameter relative to the threaded portion. By rotation of the adjusting shaft 38 the threaded portion 40 is screwed—depending upon the direction of rotation—into or out of the through channel 42, whereby the annular gap formed between the conical lug 46 and the through channel 42 is decreased or increased in size. This annular gap, through which the fluid medium overflowing out of one working chamber 24, 26 into the respective other working chamber 26, 24 must pass during the piston movement, forms a throttle gap which is the cause of the magnitude of the damping or decelerating force counteracting the piston movement. Thus it is clear that by rotation of the adjusting shaft 38 a change in the passage cross-section of the throttle gap and thus in the damping characteristic of the damping device is possible.

In order to simplify delicate rotation of the adjusting shaft 38, of which the diameter corresponds to the diameter of the piston rod 28, a handle 48 in the form of a rotary knob of enlarged diameter provided with grooves on its outer circumferential surface is fixed on the outer free end of the adjusting shaft 38.

Figure 8A:
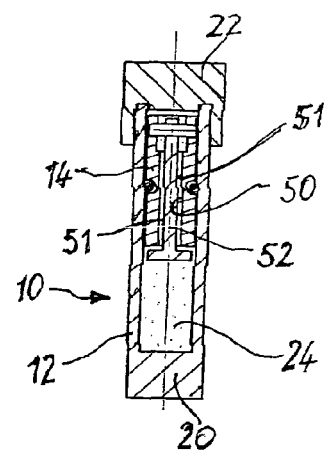
FIG. 8a shows a sectional view in the direction of the arrows 8a-8a in FIG. 8.
Figure 6:
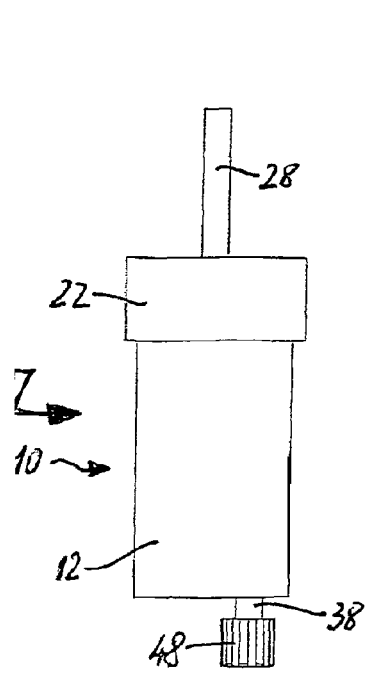
FIG. 6 shows a side view in the direction of the arrow 6 in FIG. 5.
Figure 7:
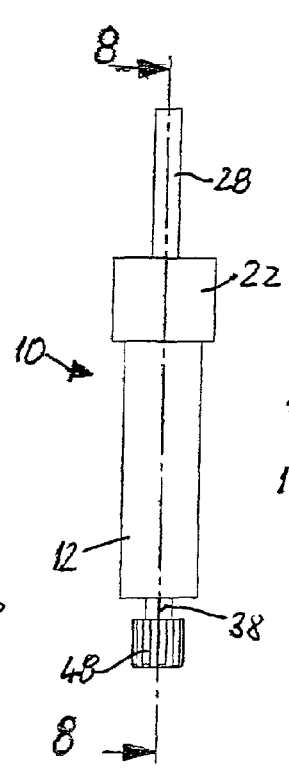
FIG. 7 shows a view in the direction of the arrow 7 in FIG. 6.
Figure 8:
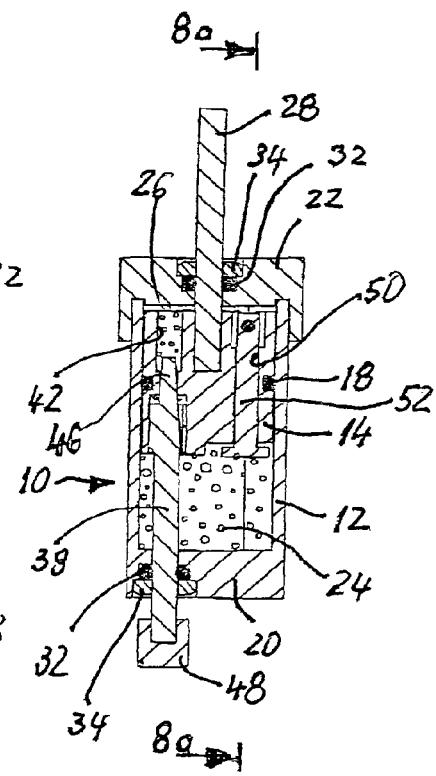
FIG. 8 shows a sectional view in the direction of the arrows 8-8 in FIG. 7.
Figure 9:
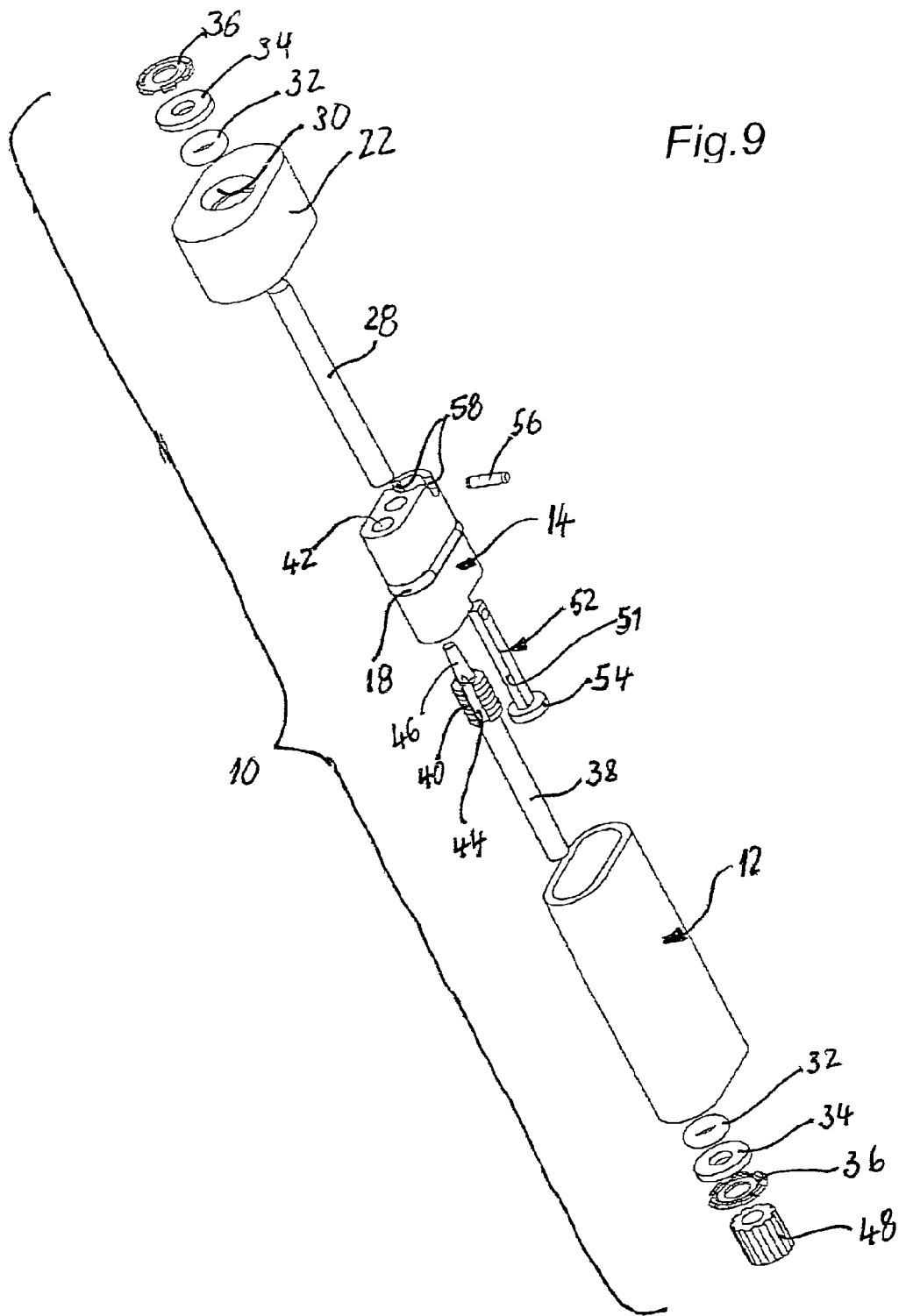
FIG. 9 shows an exploded representation of the damping device according to the invention in an isometric representation of its components.

A second through channel 50, which connects the two working chambers and in which an elongate shaft 52 is retained so as to be longitudinally movably by a predetermined stroke, is provided in a region of the piston 14 which with respect to the longitudinal central axis of the housing lies diametrically opposite the region of the through channel 42 which receives the adjusting shaft 38. The second through channel 50 and the shaft 52 have differing cross-sectional dimensions. As can be seen in FIG. 8a, in order to form an overflow passage between the working chambers 24, 26 the shaft 52 is provided in opposing regions with flat areas 51 over the damping medium can flow through.

On the lower end of the shaft 52 facing the working chamber 24 there is provided a valve disc 54 which has a larger diameter than the cross-section of the second through channel 50 and which when an overpressure prevails in the working chamber 24 is pressed onto the end face of the piston 14 and then closes the overflow passage between the second through channel 50 and the shaft 52.

On the end opposite the end provided with the valve disc, the shaft 52 has a pin 56 passing through it of which the end regions projecting from the shaft 52 at both ends engage in lateral slits 58 in the piston 14. It can be seen that the shaft 52 is retained undetachably in the piston 14 by the valve disc 54 on the one hand and the pin 56 on the other hand, whereby the possible longitudinal movement of the shaft 52 in the through channel 50 is predetermined by the longitudinal extent of the slits 58.

FIGS. 10 to 12a show an embodiment of a damping device 10 according to the invention in which the external dimensions are further reduced by comparison with the embodiment described above in connection with FIGS. 1 to 8 and which largely corresponds to the embodiment described above in its basic construction and operation. Therefore in order to avoid unnecessary repetitions only the modifications which have been made are described below, whilst reference may be made to the preceding description for the conforming features of both embodiments, since component parts in both embodiments which correspond functionally are assigned the same reference numerals in the appertaining drawings.

The significant difference from the first embodiment is that the effect of a non-return valve, produced by the shaft 52 which is disposed so as to be longitudinally movable in the second through channel 50 with a valve disc 54 provided on its free end, is achieved in the second embodiment in alignment with the longitudinal central axis of the piston rod 28. for this purpose the fixing hole receiving the end of the piston rod 28 on the housing side is constructed as a through opening 50' passing completely through the piston. The lengthened piston rod 28 passes completely through the through opening 50' and projects somewhat into the lower working chamber 24. A valve disc 54 constructed as an annular disc is then again disposed movably on the projecting end of the piston rod 28. The travel of this valve disc 54 is delimited by a retaining head of enlarged diameter forced onto the free end of the piston rod.

The piston rod 28 is fixed in the piston 14 by a pin 60 which is inserted into a transverse bore in the piston 14 passing tangentially through the through opening 50' and which in the region of the through opening 50' engages in a corresponding tangentially extending rounded recess in the piston rod 28. The overflow passage through which the damping medium can pass from the working chamber 26 into the working chamber 24 when the valve disc 54 is lifted off from the lower end face of the piston is formed by a longitudinal groove 51' shown in FIGS. 12 and 12a in the wall of the through opening 50' also shaped with a complementary cross-section relative to the piston rod 28. Due to the integration into the lengthened piston rod of the functional components which bring about the non-return function, the piston can have a reduced width in the transverse direction and thus also the housing 12 of the damper has a correspondingly reduced width.

A third embodiment, which differs from the previously described second embodiment in that the alteration of the damping characteristic can be set in predetermined stages rather than progressively, is described below in connection with FIGS. 13 to 22.

Since the modifications which have been made relate exclusively to the assembly formed by the piston 14, the piston rod 28 and the adjusting shaft 38, i.e. the housing is unchanged relative to the housing 12 of the second embodiment, only the changes which have been made to the said assembly are described below, and functionally similar components of this assembly are also assigned the same reference numerals as have been used in the embodiments described above, so that it is sufficient for only the modifications which have been made to be described below. The said assembly is illustrated in FIGS. 13 to 16 in different views or sections, whilst FIGS. 17 and 18 show the adjusting shaft 38 and FIGS. 19 to 22 show the piston in each case separately in various views or sectional representations.

The end portion 38b of the adjusting shaft 38 on the piston side which is reduced in diameter relative to the portion 38a passing through the working chamber 24 is rotatable in the passage 42 of the piston 14 and retained so as to be longitudinally movable by a predetermined stroke. In the transition from the portion 38a with the larger diameter to the portion 38b with the smaller diameter a radially projecting throttle collar 46' is provided which in one end position of the longitudinal travel of the adjusting shaft 38 rests against the recessed end face of the piston 14 facing the working chamber 24. In this position resting on the piston the adjusting shaft is retained by a helical spring 62 which is pre-assembled under compression pretension and supported on the base of a recess provided in the opposing piston end face, the other end of the helical spring being supported on a lock washer 64 mounted on the free end of the adjusting shaft 38 lying in the working chamber 26 and facing away from the piston.

The throttle collar 46' is provided with a plurality of radial cut-outs 66 which are offset with respect to one another in the circumferential direction and have the same width but different radial extent and which can be selectively aligned with an overflow passage 42' connecting the working chambers 24, 26 by rotation of the adjusting shaft 38. In this case the overflow passage 42' is formed by a groove-like recess passing through the wall of the portion of the adjusting shaft 38b which passes through with a complementary diameter to the through channel 42.

A projection 70 which corresponds in width to the cut-outs 66 in the throttle collar 46 projects from the recessed end face of the piston facing the throttle collar 46', wherein in the position in which it is forced resiliently into the abutment position of the throttle collar 46' on the end face of the piston the projection engages in one of the cut-outs 66 and locks the adjusting shaft 38 against rotation. The cut-out 66 located in the locking position can be lifted out of the engaged position with the associated cut-out by longitudinal displacement of the adjusting shaft 38 against the resilient bias of the helical spring 62, whereby the adjusting shaft is then rotatable in the through channel 42 and thus another cut-out 66 of differing passage cross-section provided in the throttle collar 46' can be aligned with the overflow passage 42'.

A further modification relative to the second embodiment resides in the fact that the piston rod 28 is retained in the through opening 50' in the piston 14 so as to be longitudinally movable by a predetermined stroke. In the region of the through opening 50' through which the piston rod 28 passes, at least one overflow passage 51' is constructed and the piston rod is provided in the working chamber 26 through which it passes with a valve collar 54' in the shape of an annular disc which during the longitudinal displacement of the piston rod 28 in the context of the predetermined stroke is adjustable between a position in which it rests on the associated piston end surface and thus closes the overflow passage 51' and a position in which it is lifted off from the piston end face and frees the overflow passage. The longitudinally movable fixing of the piston rod 28 in the piston 14 again takes place by means of a pin 60 which is inserted into a transverse bore in the piston 14 passing tangentially through the through opening 50' and which in the region of the through opening 50' engages in an associated tangentially extending recess 55, the longitudinal extent of which parallel to the longitudinal central axis of the piston rod 28 is dimensioned to correspond to the predetermined stroke.

In the illustrated embodiment the valve collar 54' is formed integrally on the piston rod 28.

It can be seen that within the scope of the idea underlying the invention modifications and variants of the described embodiments are possible. Thus for example it can be readily seen that the strong damping effect which in the described embodiments is achieved during insertion of the piston rod 28 into the housing 12 and can be varied by rotation of the adjusting shaft 38 can be converted to a damping effect in the opposite direction, i.e. when the piston rod 28 is withdrawn from the housing, if the function of the non-return valve is replaced by arrangement of a valve disc on the opposing upper face of the piston, i.e. the face directed towards the working chamber 26.

The invention claimed is:

1. A damping device for damping of movement of movable furniture parts of pieces of furniture, the damping device comprising: a piston (14) which is mounted in a housing (12) so as to be longitudinally displaceable and which as a function of its displaced position forms on opposing sides two working chambers (24; 26) which are variable in size and are filled with a fluid damping medium, enabling by means of at least one overflow connection a throttled overflow of the damping medium between the two working chambers (24; 26), the two working chambers include a first working chamber (26) through which the piston rod (28) passes and a second working chamber (24) lying opposite the first working chamber (26), a piston rod (28) extending in a sealed manner out of an associated front end of the housing (12) is connected on one side of the piston (14) and the movement of the furniture part to be damped is transferred to the piston (14) by way of an outer end of the piston rod remote from the piston, wherein on a side of the piston (14) lying opposite the first working chamber (26) on the piston rod side there is connected an elongate adjusting shaft (38) with a diameter substantially corresponding to a diameter of the piston rod (28), and a free end of the adjusting shaft also extending out of the housing (12) out of an end face lying opposite an end face closed on the piston rod side, and that an end of the adjusting shaft (38) connected to the piston (14) engages in a through channel connecting the two working chambers and is constructed in such a way that it forms a throttle cross-section which is variable in size in the through channel (42) due to adjusting movements of the shaft (38) relative to the piston (14), wherein the adjusting shaft (38) and the through channel (42) are offset laterally from one another, but each is disposed parallel to a longitudinal central axis of the housing.

2. The damping device as claimed in claim 1, wherein in a region of the end of the adjusting shaft (38) on the piston side, a threaded portion (40) is provided which is enlarged in diameter by comparison with the shaft diameter and engages in a portion of the through channel (42) provided with a complementary matching thread, wherein at least one recess (44) which forms a passage from the second working chamber (24) into the through channel (42) is then provided in the threaded portion (40) of the adjusting shaft (38).

3. The damping device as claimed in claim 2, wherein a lug (46) which tapers conically in a direction of its free end then projects from an end face of the threaded portion (40) of the adjusting shaft (38) remote from the second working chamber (24) into a portion of the through channel (42) which is reduced in diameter relative to the threaded portion (40).

4. The damping device as claimed in claim 1, wherein a handle (48) is provided on the free end of the adjusting shaft (38).

5. The damping device as claimed in claim 4, wherein the handle (48) is constructed as a rotary knob of enlarged diameter which is provided on its circumferential surface with grooves or knurlings.

6. The damping device as claimed in claim 1, wherein a longitudinal central axis of the piston rod (28) is aligned with a longitudinal central axis of the housing (12).

7. The damping device as claimed in claim 1, wherein the piston (14) is disposed so as to be longitudinally displaceable within the housing (12), and both the housing (12) and the piston (14) each have a non-circular cross-section.

8. The damping device as claimed in claim 7, wherein both the housing (12) and the piston (14) each have a non-circular cross-section which is oval shaped.

9. The damping device as claimed in claim 7, wherein both the housing (12) and the piston (14) each have a non-circular cross-section which is formed by two parallel straight boundaries which are closed at their ends by circular arcs.

10. The damping device as claimed in claim 1, wherein a diametrically opposed region of the piston (14) which is offset with respect to a region of the through channel (42) receiving the adjusting shaft (38) in relation to the longitudinal central axis of the housing (12), a second through channel (50) is provided which connects the two working chambers (24; 26).

11. The damping device as claimed in claim 10, wherein a shaft (52) is retained in the second through channel (50) so as to be longitudinally movable by a predetermined stroke, wherein at least in a part-region, the cross-sectional surface of the shaft is smaller than the clear cross-sectional surface of the second through channel (50) in order to form an overflow passage between the working chambers (24; 26).

12. The damping device as claimed in claim 11, wherein on one free end of the shaft (52) retained in the second through channel (50), a valve disc (54) is provided which has a larger cross-section at least in some areas than the cross-section of the second through channel (50) and which, in the case of a higher pressure in the second working chamber (24) than at a free end of the first working chamber (26), is pressed onto the facing end wall of the piston (14) and at least partially closes the overflow passage between the second through channel (50) and the shaft (52).

13. The damping device as claimed in claim 12, wherein a pin (56), of which opposing free ends projecting from the shaft engage in slits (56) in the piston (14) which extend in the longitudinal direction of the shaft, passes through the end of the shaft (52) lying opposite the end provided with the valve disc (54).

14. The damping device as claimed in claim 12, wherein the valve disc (54) is provided on the free end of the shaft (52) which is retained in the second through channel (50) and is directed into the second working chamber (24) through which the adjusting shaft (38) passes.

15. The damping device as claimed in claim 1, wherein with a longitudinal central axis of the piston rod (28) offset laterally with respect to a longitudinal central axis of the adjusting shaft (38), the piston rod (28) is retained in a through opening (50') in the piston (14) in such a way that its free end within the housing still projects over an adjoining lateral region of an end face of the piston into the second working chamber (24), that an overflow passage (51) is formed in the region of the through opening (50') in the piston (14) through which the piston rod (28) passes, and that on the end of the piston rod (28) projecting into the second working chamber (24), a valve disc (54) is retained so as to be movable between a position in which it rests on the piston end face and closes the overflow passage (51) and a position in which it is lifted off from the piston end face and connects the overflow passage to the second working chamber (24).

16. The damping device as claimed in claim 15, wherein the through opening (50') in the piston (14) has a circular cross-section which substantially corresponds to the diameter of the piston rod (28) and is provided in a part-region with a radial expansion of the diameter which produces a through groove forming an overflow passage (51) in the through opening.

17. The damping device as claimed in claim 1, wherein with a longitudinal central axis of the piston rod (28) offset laterally with respect to a longitudinal central axis of the adjusting shaft (38), the piston rod (28) is disposed so as to be longitudinally movable by a limited stroke in a through opening (50') passing through the piston (14) and at least one overflow passage (51') is formed in a region of the through opening (50') through which the piston rod (28) passes, and that the piston rod (28) is provided in a region where it passes from the first working chamber (26) into the through opening (50') with a circumferential radially projecting valve collar (54') which in the context of the longitudinal travel of the piston rod (28) is movable between a position in which it rests on a piston end face and closes an overflow passage and a position in which it is lifted off from the piston end face and connects the overflow passage (51) to the second working chamber (24).

18. A damping device for damping of movement of movable furniture parts of pieces of furniture, the damping device comprising: a piston (14) which is mounted in a housing (12) so as to be longitudinally displaceable and which as a function of its displaced position forms on opposing sides two working chambers (24; 26) which are variable in size and are filled with a fluid damping medium, enabling by means of at least one overflow connection a throttled overflow of the damping medium between the two working chambers (24; 26), the two working chambers include a first working chamber (26) through which the piston rod (28) passes and a second working chamber (24) lying opposite the first working chamber (26), a piston rod (28) extending in a sealed manner out of an associated front end of the housing (12) is connected on one side of the piston (14) and the movement of the furniture part to be damped is transferred to the piston (14) by way of an outer end of the piston rod remote from the piston, wherein on a side of the piston (14) lying opposite the first working chamber (26) on the piston rod side there is connected an elongate adjusting shaft (38) with a diameter substantially corresponding to a diameter of the piston rod (28), and a free end of the adjusting shaft also extending out of the housing (12) out of an end face lying opposite an end face closed on the piston rod side, and that an end of the adjusting shaft (38) connected to the piston (14) engages in a through channel connecting the two working chambers and is constructed in such a way that it forms a throttle cross-section which is variable in size in the through channel (42) due to adjusting movements of the shaft (38) relative to the piston (14), wherein the adjusting shaft (38) is disposed in the through channel (42) of the piston (14) connecting the working chambers (24, 26) so as to be rotatable and longitudinally movable by a predetermined stroke and is retained so as to be biased resiliently into an end position in which a throttle collar (46') which projects radially from the circumferential surface of the adjusting shaft (38) in the second working chamber (24) on the adjusting shaft side rests on a piston end face, and that the throttle collar is provided with a plurality of cut-outs (66) which are offset with respect to one another in the circumferential direction with differing passage cross-sections and which is selectively alignable, by rotation of the adjusting shaft (38) in the through channel (42), with an overflow passage (42') provided in the piston (14) and connecting the working chambers (24, 26).

19. The damping device as claimed in claim 18, wherein the overflow passage (42') is formed by a recess in the wall of the through channel (42) which has a complementary diameter to the adjusting shaft (38) and passes through the piston (14).

20. The damping device as claimed in claim 18, wherein the cut-outs (66) in the throttle collar (46') open in the circumferential surface of the throttle collar and are of differing radial extent.

21. The damping device as claimed in claim 19, wherein a projection (70) which corresponds in width to the cut-outs (66) in the throttle collar (46') projects from the end face of the piston (14) facing the throttle collar, engages in one of the cut-outs in the position in which it is forced resiliently into the contact position of the throttle collar on the piston end face, and locks the adjusting shaft against rotation, wherein the cut-out (66) located in the locking position can be moved by longitudinal displacement of the adjusting shaft (38) against the resilient spring bias out of the engaged position of the projection (70) with the cut-out and the adjusting shaft is then rotatable in the through channel (42).

22. The damping device as claimed in claim 18, wherein the piston rod (28) is retained in the piston (14) so that it is longitudinally movable in a through opening (50') by a predetermined stroke, that at least one overflow passage (51') is constructed in a region of the through opening (50') through which the piston rod (28) passes, and that the piston rod (28) is provided in the first working chamber (26) through which it passes with a valve collar (54') in the shape of an annular disc which is adjustable during the longitudinal displacement of the piston rod (28) within the scope of the predetermined stroke between a position in which it rests on an associated piston end face and thereby closes the overflow passage (51') and a position in which it is lifted off from the piston end face and frees the overflow passage (51').

23. The damping device as claimed in claim 22, wherein the valve collar (54') is an integral part of the piston rod (28).

\* \* \* \* \*